United States Patent
Deng et al.

(10) Patent No.: US 11,802,758 B2
(45) Date of Patent: Oct. 31, 2023

(54) SYSTEM FOR PRECISION DISPLACEMENT MEASUREMENT BASED ON SELF-TRACEABLE GRATING INTERFERENCE

(71) Applicant: Tongji University, Shanghai (CN)

(72) Inventors: Xiao Deng, Shanghai (CN); Xinbin Cheng, Shanghai (CN); Zichao Lin, Shanghai (CN); Zhenjie Gu, Shanghai (CN); Yulin Yao, Shanghai (CN); Tongbao Li, Shanghai (CN)

(73) Assignee: Tongji University, Shanghai (CN)

( * ) Notice: Subject to any disclaimer, the term of this patent is extended or adjusted under 35 U.S.C. 154(b) by 3 days.

(21) Appl. No.: 17/586,283

(22) Filed: Jan. 27, 2022

(65) Prior Publication Data

US 2023/0042098 A1    Feb. 9, 2023

(30) Foreign Application Priority Data

Jul. 29, 2021  (CN) .......................... 202110862699.2

(51) Int. Cl.
| | |
|---|---|
| *G01B 9/02* | (2022.01) |
| *G01B 9/02001* | (2022.01) |
| *G01S 7/481* | (2006.01) |
| *G01S 17/08* | (2006.01) |

(52) U.S. Cl.
CPC ........ *G01B 9/02007* (2013.01); *G01S 7/4818* (2013.01); *G01S 17/08* (2013.01); *G01B 2290/30* (2013.01)

(58) Field of Classification Search
CPC ............ G01B 9/02007; G01B 2290/30; G01B 11/02; G01B 9/02; G01S 7/4818; G01S 17/08; G01D 5/266

See application file for complete search history.

(56) References Cited

U.S. PATENT DOCUMENTS

| | | | | |
|---|---|---|---|---|
| 5,000,542 A | * | 3/1991 | Nishimura | ............... G01D 5/38 359/437 |
| 2006/0139654 A1 | * | 6/2006 | Takahashi | .......... G01D 5/34715 356/494 |

FOREIGN PATENT DOCUMENTS

CN       1793778 A       6/2006

OTHER PUBLICATIONS

Chinese Office Action for Chinese Patent Application No. 202110862699.2 dated Mar. 3, 2022.

* cited by examiner

*Primary Examiner* — Hwa Andrew Lee
(74) *Attorney, Agent, or Firm* — Knobbe, Martens, Olson & Bear, LLP

(57) ABSTRACT

A system for precision displacement measurement based on a self-traceable grating interference includes a coherent light source, a photoelectric detection module, a self-traceable grating and a signal processing module. The self-traceable grating is arranged on a to-be-measured displacement motion platform. The coherent light source, the photoelectric detection module and the signal processing module are sequentially connected. Laser generated by the coherent light source propagates through the photoelectric detection module and is incident on the self-traceable grating, diffracts with the self-traceable grating, returns to the photoelectric detection module to continue propagating and enters the signal processing module. The signal processing module collects an interference signal to obtain a motion displacement and a motion direction.

8 Claims, 3 Drawing Sheets

SYSTEM FOR PRECISION DISPLACEMENT MEASUREMENT BASED ON SELF-TRACEABLE GRATING INTERFERENCE

CROSS-REFERENCE TO RELATED APPLICATION

This application claims the priority to Chinese Patent Application No. 202110862699.2, filed on Jul. 29, 2021, the disclosure of which is incorporated herein by reference in its entirety.

TECHNICAL FIELD

The present disclosure relates to the field of precision displacement measurement, and in particularly to a system for precision displacement measurement based on a self-traceable grating interference.

BACKGROUND

As the foundation of the modern machining and manufacturing, the precision and ultra-precision measurement techniques include parameters such as a measurement range and a measurement precision, which may determine the manufacturing size and precision. Since the beginning of the 21st century, fields such as integrated circuits and semiconductor manufacturing have developed rapidly, and a high-end precision manufacturing level is a showing of an equipment manufacturing level and a modern industrial production level in a country.

Along with the further development of nanometer measurement, various precision displacement measurement methods are derived. A laser interferometer and a grating interferometer are widely used in the manufacturing industries of various production fields because of their characteristics of large measurement range, high measurement precision and high measurement speed. Because of using the wavelength of the laser as measurement reference, the laser interferometer has the characteristics of non-contact, large measurement range, and high measurement precision and is applied to positioning of various mechanical structures. Due to the displacement measurement principle of the laser interferometer, the laser interferometer has a very high requirement for stability of the wavelength, and a wavelength perturbation will directly affect the measurement precision. For example, the wavelength changes as the temperature, humidity, and gas concentration in the measurement environment changes. Moreover, the wavelength sensitivity to the environment increases when a distance between a reading head and a to-be-measured object changes during the measurement. This disadvantage limits the application range of the laser interferometer, and the high-precision measurement capability of the laser interferometer cannot be given full play in a general environment.

The grating displacement measurement system uses a grating as a scale and a grating pitch as measurement reference. Compared with a laser interferometer using merely a wavelength as reference, the grating displacement measurement system using a grating period as reference is less sensitive to the environment, and a diffraction effect occurs when a light beam is incident on a grating surface, the periodic structure of the grating plays an average role. In addition, the internal design of the reading head of the grating interferometer is simple and compact and the optical path is symmetrical so that the distance between the reading head and the grating can reach a millimeter level, together with the distance between them will not change with the motion of the to-be-measured object, thereby reducing the influence of the environment on the measurement precision of the grating displacement system. With the development of technologies, the manufacturing level of the grating is further improved, which makes a system with the grating pitch as the measurement reference more and more widely used.

A conventional grating displacement system is manufactured by using the principle of moire fringes. Since the measurement resolution capability of the grating is directly related to a grating pitch, along with the decrease of the grating pitch, the diffraction phenomenon becomes more apparent and the signal of a moire fringe is directly affected, which result in the reduction of the measurement precision. When the grating line density reach a threshold level, the measurement precision of the grating interferometer can be improved by using the diffraction grating interference displacement measurement technique, thereby achieving high-resolution and high-precision displacement measurement. The diffraction grating displacement measurement system has the key points described below. One point is that the accuracy and consistency of the grating pitch are limited by the fabrication level of the grating in an industry. A diffractive optical element used in a conventional grating interferometer is generally a conventional grating such as a holographic grating or a ruled grating. Due to the limitation of the manufacturing process of such grating, it is impossible to ensure that each step in the process achieves positioning with high precision and repeatability. Moreover, the error of the grating pitch is large, usually greater than 1 nm. As a result, the grating pitches manufactured may be inconsistent. If the grating with large grating pitch uncertainty is applied to the displacement measurement system, the accuracy of the displacement measurement system using the grating pitch as measurement reference will be greatly reduced. The other point is that the manufacturing process of the high-density ruled grating is complicated and difficult to manufacture. The grating line density of the grating directly affects the resolution of the diffraction grating displacement measurement, together with an increase in the grating line density, the surface profile and the grating line quality of the manufactured grating cannot be guaranteed. Therefore, a grating having a high grating line density which can be repeatedly manufactured and can ensure a strict and accurate grating pitch is the key to improving the precision of the grating displacement measurement system.

SUMMARY

An object of the present disclosure is to provide a system for precision displacement measurement based on a self-traceable grating interference, which overcomes the problems that the existing displacement measurement results have no traceability and that the grating line density is low, so that the reliability of precision displacement measurement is improved.

An object of the present disclosure can be implemented by the technical solutions described below.

A system for precision displacement measurement based on a self-traceable grating interference includes a coherent light source, a photoelectric detection module, a self-traceable grating and a signal processing module. The self-traceable grating is arranged on a to-be-measured displacement motion platform. The coherent light source, the photoelectric detection module and the signal processing module are sequentially connected. After laser generated by the coherent light source propagates through the photoelectric detection module, the laser is incident on the self-traceable grating and diffracts with the self-traceable grating to obtain diffracted light, the diffracted light returns to the photoelectric detection module to continue propagating to obtain an interference signal, and the interference signal enters the signal processing module. The signal processing module is configured to collect the interference signal to obtain a motion displacement and a motion direction.

Further, the coherent light source is connected to the photoelectric detection module via a free-space connection or via an optical fiber.

Further, the photoelectric detection module includes a diffracted light generation unit and a signal reception unit. The diffracted light generation unit includes a first wave plate, a first polarization splitting prism, a second wave plate, a third wave plate, a first planar mirror and a second planar mirror. The laser received by the first wave plate is decomposed into vertically polarized light and horizontally polarized light in equal proportions through the first polarization splitting prism. After sequentially passing through the third wave plate and the first planar mirror, the vertically polarized light is incident on the self-traceable grating at a Littrow angle and diffracts with the self-traceable grating to obtain first diffracted light. After sequentially passing through the second wave plate and the second planar mirror, the horizontally polarized light is incident on the self-traceable grating at the Littrow angle and diffracts with the self-traceable grating to obtain second diffracted light. The first diffracted light and the second diffracted light then return along respective original optical paths and enter the signal reception unit together after being combined.

Further, the first wave plate is a half-wave plate which makes a polarization direction of the laser at 45° relative to an incident plane, and the second wave plate and the third wave plate are quarter-wave plates which make a fast axis at 45° relative to the incident plane.

Further, the signal reception unit includes a non-polarizing beam splitting plate, a fourth wave plate, a fifth wave plate and two detection sub-units. The two detection sub-units are respectively arranged corresponding to the fourth wave plate and the fifth wave plate. A diffracted light passing through the non-polarizing beam splitting plate is divided in a non-polarizing manner into first light and second light in equal proportions of a light intensity, the first light is sequentially incident on the fourth wave plate and one of the two detection sub-units corresponding to the fourth wave plate, and the second light is sequentially incident on the fifth wave plate and another one of the two detection sub-units corresponding to the fifth wave plate. Each of the two detection sub-units is connected to the signal processing module.

Further, the fourth wave plate is a quarter-wave plate which makes a fast axis at 45° relative to an incident plane, and the fifth wave plate is a half-wave plate which makes a fast axis at 22.5° relative to the incident plane.

Further, each of the two detection sub-units includes a second polarization splitting prism, a first photodetector and a second photodetector, and the first photodetector and the second photodetector respectively receive vertically polarized light and horizontally polarized light decomposed by the second polarization splitting prism in equal proportions so as to form an interference signal.

Further, the signal processing module is configured to collect the interference signal to obtain the motion displacement and the motion direction by:

acquiring a light intensity of the interference signal, and obtaining, based on a relational expression $I \propto \cos(4\pi x/d)$, a one-dimensional motion distance x of a grating plane where the self-traceable grating is located, where I is the light intensity of the interference signal and d is a self-traceable grating pitch; and solving phase information of an interference signal in each path by phase unwrapping and arctangent so as to determine a positive or negative direction of a motion.

Further, the self-traceable grating is manufactured and obtained in a manner of heating and sublimating a metal material to a gas state and directing a metal atomic beam by means of effusion in a vacuum environment by using atomic lithography.

Further, a wavelength of the laser of the coherent light source is less than 2 times the self-traceable grating pitch.

Compared with the related art, the present disclosure has beneficial effects, such as those described below.

1. In some embodiments of the present disclosure, the self-traceable grating is used to form the interference signal so as to obtain the displacement measurement result, which has the characteristic of being traceable to natural constants. The self-traceable grating interferometer not only has the same measurement speed and resolution as the existing grating interferometer, but also overcomes the problems that the displacement measurement result has no traceability by using the existing grating interferometer and that the grating line density is low, so that the reliability of the precise displacement measurement is improved.

2. The self-traceable grating has a high grating line density, improving the resolution capability of displacement measurement under optical subdivision.

3. The self-traceable grating has a stable structure, uniform surface profile and high manufacturing consistency. Displacement measurement can be widely used in various environments.

4. In some embodiments of the present disclosure, the wave plate in the photoelectric detection module is provided to change the polarization state of the diffracted light so that an effective interference signal can be obtained and the accuracy of displacement measurement can thus be improved.

| | Reference list |
|---|---|
| 1 | coherent light source |
| 2 | photoelectric detection module |
| 3 | self-traceable grating |
| 4 | displacement motion platform |
| 5 | signal processing module |

-continued

| Reference list | |
|---|---|
| 201 | first wave plate |
| 202 | first polarization splitting prism |
| 203 | second wave plate |
| 204 | third wave plate |
| 205 | first planar mirror |
| 206 | second planar mirror |
| 207 | non-polarizing beam splitting plate |
| 208 | fourth wave plate |
| 209 | fifth wave plate |
| 210 | second polarization splitting prism |
| 211 | first photodetector |
| 212 | second photodetector |
| 301 | chromium atomic beam |
| 302 | convergent laser |
| 303 | one-dimensional deposition grating |

DETAILED DESCRIPTION

The present disclosure will be described in detail below in conjunction with drawings and embodiments. The embodiments are implemented on the basis of the technical solutions of the present disclosure. Detailed implementations and specific operation processes are given, but the scope of the present disclosure is not limited to the embodiments described below.

Figure 1:
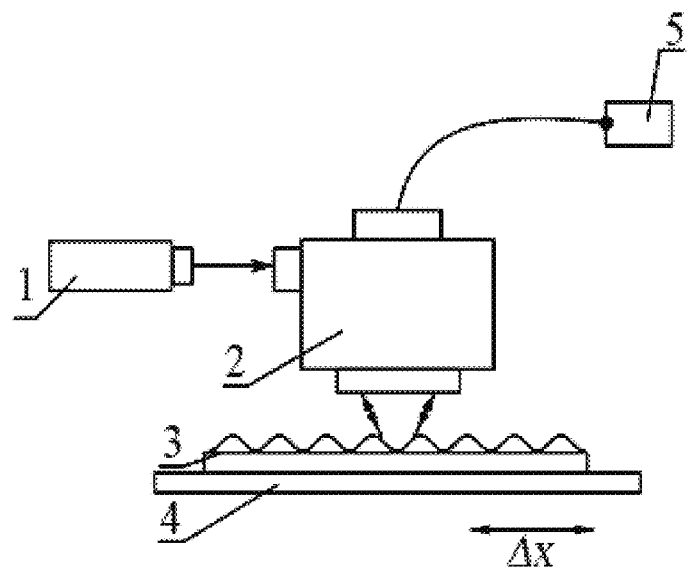
FIG. 1 is a structure diagram of some embodiments of the present disclosure.
Figure 2:
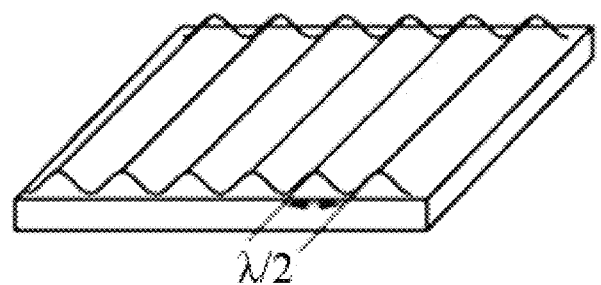
FIG. 2 is a schematic diagram of a self-traceable grating according to some embodiments of the present disclosure.

As shown in FIGS. 1 and 2, this embodiment provides a system for precision displacement measurement based on a self-traceable grating interference. The system includes a coherent light source 1, a photoelectric detection module 2, a self-traceable grating 3 and a signal processing module 5. The self-traceable grating 3 is arranged on a to-be-measured displacement motion platform 4. The coherent light source 1 is connected to the photoelectric detection module 2 via a free-space connection or via an optical fiber. The photoelectric detection module 2 is connected to the signal processing module 5. A wavelength of the laser of the coherent light source 1 is less than two times the grating pitch of the self-traceable grating 3. After the laser propagates through the photoelectric detection module 2, the laser is incident on the self-traceable grating 3 and diffracts with the self-traceable grating 3 so as to obtain diffracted light. The diffracted light returns to the photoelectric detection module 2 to continue propagating so as to obtain an interference signal, and the interference signal enters the signal processing module 5. The signal processing module 5 collects the interference signal to obtain a motion displacement and a motion direction.

Figure 3:
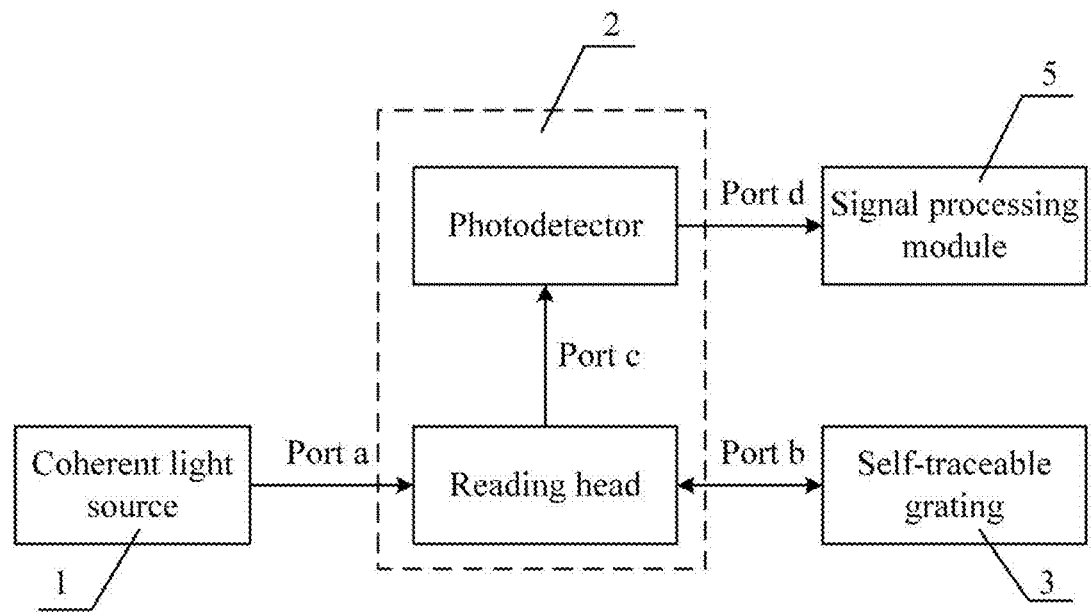
FIG. 3 is a schematic diagram of light transmission according to some embodiments of the present disclosure.

As shown in FIG. 3, the photoelectric detection module 2 includes a reading head and a photodetector. The laser generated by the coherent light source 1 accesses port A of an optical transmission path. The laser continues to propagate after entering the reading head, is symmetrically incident on the surface of the self-traceable grating 3 via port B and diffracts with the self-traceable grating 3 to obtain a diffracted light. The diffracted light returns to the optical transmission path, interferes in the reading head to obtain an interference signal, and the interference signal accesses the photodetector via port C. The photodetector converts the interference signal of the diffracted light into a current signal and transmits the current signal to the signal processing module via port D as an output signal.

In the preceding measurement system, the self-traceable grating is used as an interferometer and has a characteristic of being traceable to the natural constants. A displacement measurement result is based on a pitch of an atomic lithography grating, can be directly traceable to a transition frequency between atomic transition energy levels and has a feature of self-traceability. Compared with other grating interferometer displacement measurement systems, the preceding measurement system overcomes the disadvantages of high difficulty in displacement measurement traceability and low grating line density, and the measurement method of direct traceability has advantages of high displacement measurement accuracy and strong robustness.

The self-traceable grating is a deposition grating whose grating pitch is strictly traceable to natural constants. The self-traceable grating is manufactured and obtained by using the atomic lithography. Due to the inherent characteristics of the manufacturing process, the grating pitch value of the self-traceable grating can be directly traceable to the wavelength corresponding to the atomic transition energy level. The error of the grating pitch can be less than 0.001 nm in theory, and the period error of the actual product is not greater than 0.1 nm. Moreover, a chromium (Cr) atomic lithography grating can have the grating line density up to 4700 l/mm, has a sinusoidal surface profile, can be repeatedly manufactured many times, and has the characteristics of high consistency, high uniformity and strong resistance to environmental changes under the condition of keeping a high grating line density.

The self-traceable grating is applied to a diffraction grating displacement measurement system. The grating pitch directly traceable to the natural constants is used as the measurement reference, and the measured displacement is also indirectly traceable to natural constants. The traceability characteristic of the displacement measurement greatly improves the reliability of the measurement process. Moreover, the chromium atomic lithography grating is used as an example, and a grating having a high grating line density up to 4700 l/mm can have extremely high resolution under optical subdivision. The self-traceable grating is applied to a grating interferometer precision displacement measurement system, which has the advantages below ensured over other conventional grating interferometers under the preconditions of high precision and high measurement speed.

1. The measured result of the self-traceable grating interferometer has the characteristic of being indirectly traceable to natural constants. Since the accuracy of the self-traceable grating pitch can reach the order of picometre, the reliability of displacement measurement is high. 2. The self-traceable grating can have a grating line density up to 4700 l/mm and can achieve very high resolution merely by optical subdivision. Further, the measurement resolution capability of the order of picometre can be obtained by electronic subdivision. 3. The self-traceable grating has a stable structure, uniform surface profile and high manufacturing consistency. Displacement measurement can be applied to various environments. The self-traceable grating interferometer is applied to an industrial system, and the accuracy of nanoscale measurement can be greatly increased through the traceability principle of displacement measurement.

Figure 4:
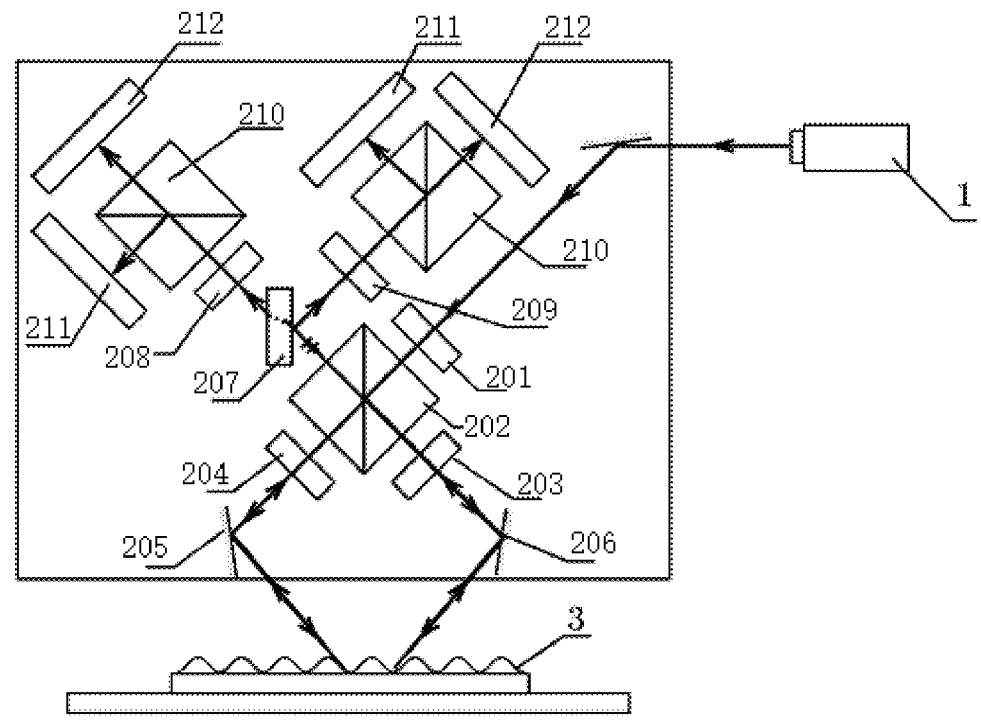
FIG. 4 is a schematic diagram of an internal structure of a reading head of some embodiments.

As shown in FIG. 4, the photoelectric detection module 2 is a reflective grating interferometer optical path module and includes a diffracted light generation unit and a signal reception unit. The diffracted light generation unit includes a first wave plate 201, a first polarization splitting prism 202, a second wave plate 203, a third wave plate 204, a first planar mirror 205 and a second planar mirror 206. The signal reception unit includes a non-polarizing beam splitting plate 207, a fourth wave plate 208, a fifth wave plate 209 and two detection sub-units. Each detection sub-unit includes a second polarization splitting prism 210, a first photodetector 211 and a second photodetector 212. The first photodetector 211 and the second photodetector 212 respectively receive vertically polarized light and horizontally polarized light decomposed by the second polarization splitting prism 210 in equal proportions so as to form an interference signal. The first wave plate 201 and the fifth wave plate 209 are each a half-wave plate. The second wave plate 203, the third wave plate 204 and the fourth wave plate 208 are each a quarter-wave plate. The fast axis of the fifth wave plate 209 is at 22.5° relative to an incident plane. A fast axis of a quarter-wave plate is at 45° relative to the incident plane.

The process of acquiring the interference signal by using the preceding photoelectric detection module in this embodiment is as described below.

A coherent light source 1 having a wavelength of 375 nm generates a beam of linearly polarized laser, a line width of the laser is less than 10 GHz and the laser is incident on the photoelectric detection module. The direction of the fast axis of the first rotatable wave plate 201 is adjusted so that the polarization direction of the incident laser is at 45° relative to the incident plane. After passing through the first wave plate 201, the incident laser is normally incident on the first polarization splitting prism 202. The first polarization splitting prism 202 decomposes the incident light in equal proportions into two components, that is, vertically polarized light and horizontally polarized light.

The vertically polarized light passes through the third wave plate 204 after being transmitted the first polarization splitting prism 202 so that the vertically polarized light becomes right-handed circularly polarized light. The right-handed circularly polarized light passes through the first planar mirror 205 and is incident on the self-traceable grating 3 at a Littrow angle. The incident light diffract with the self-traceable grating 3 to obtain first diffracted light. The −1 order diffracted light of the first diffract light returns along the original optical path, passes through the third wave plate 204 again and becomes new horizontally polarized light. The new horizontally polarized light passes through the first polarization splitting prism 202 and is reflected and incident into the signal reception unit.

The horizontally polarized light reflected by the first polarization splitting prism 202 passes through the second wave plate 203 (the second wave plate 203 is the quarter-wave plate, and the fast axis of the quarter-wave plate is at 45° relative to the incident plane) and becomes left-handed circularly polarized light. The left-handed circularly polarized light passes through the second planar mirror 206 and enters the self-traceable grating 3 at the Littrow angle. The incident light diffracts with the self-traceable grating 3 to obtain second diffracted light. The −1 order diffracted light of the second diffracted light returns along the original optical path, passes through the second wave plate 203 again and becomes new vertically polarized light. The new vertically polarized light passes through the first polarization splitting prism 202 and is transmitted, combined with the new horizontally polarized light to obtain target diffracted light, and the target diffracted light is incident on the signal reception unit.

The target diffracted light passing through the non-polarizing beam splitting plate 207 is divided in a non-polarizing manner into first light and second light in equal proportions of a light intensity. The first light and the second light are respectively incident on the fourth wave plate 208 and the fifth wave plate 209. The fast axis of the fourth wave plate 208 is at 45° relative to the incident plane, and the fast axis of the fifth wave plate 209 is at 22.5° relative to the incident plane. After passing through the corresponding wave plate, the light passes through the second polarization splitting prism 210, the vertically polarized part of the light is transmitted to the inside of the second photodetector 212 for reception, and the horizontally polarized part of the light is reflected to the inside of the first photodetector 211 for reception. The orthogonal interference signals in four paths collected by the photodetectors access the signal processing module 5. The orthogonal interference signals in the four paths are subjected to phase unwrapping and arctangent operation so that the one-dimensional motion distance and motion direction of the grating plane where the self-traceable grating 3 is located is obtained.

In the preceding photoelectric detection module, the polarization state of diffracted light is changed through a change of the direction of the fast axis of the quarter-wave plate and the direction of the fast axis of the half-wave plate. Then, the diffracted light in two paths is combined by a polarization beam splitting prism so that the polarization directions of the diffracted light in the two paths are perpendicular to each other. The direction of the fast axis of the quarter-wave plate and the direction of the fast axis of the half-wave plate in front of the photodetectors are adjusted and a non-polarizing beam splitter and the polarization beam splitting prism are used so that the polarized light perpendicular to each other is divided into light in four paths and interference can occur in each path. The signals in four paths obtained are signals whose phases sequentially differ by 90° and such signals are received by the photodetectors. The photodetector includes at least one light reception unit for detecting the interfered diffracted light. In this embodiment, the photodetector includes, but is not limited to, a photodiode.

The interference light intensity of the signals in four paths whose phases sequentially differ by 90° has the following relationship: $I \propto \cos(4\pi x/d)$. In the formula, x denotes the distance by which the displacement platform moves and d denotes the self-traceable grating pitch. The phase of the interference signal in each path is obtained by using phase unwrapping and arctangent methods, and then the motion direction is obtained. The measurement displacement is then obtained by electronic subdivision.

The self-traceable grating used in this measurement system is manufactured and obtained in a manner of heating and sublimating a metal material to a gas state and directing a metal atomic beam by means of effusion in a vacuum environment by using atomic lithography. The metal atomic beam element is any one of chromium, iron, sodium, aluminum or ytterbium. A one-dimensional atomic lithography grating having a pitch traceable to natural constants and manufactured by using atomic lithography and various types of gratings manufactured by using atomic lithography gratings as masks are included, and the present disclosure is not limited thereto. The incident manner includes, but is not limited to, a grating Littrow structure which refers to a manner in which the incident light is incident obliquely from symmetrical directions to the grating to be diffracted, and the diffracted light returns to the reading head along their respective original path. The incident angle to the grating $\theta = \arcsin(\lambda/2d)$, where $\lambda$ is the wavelength of the laser and d is the self-traceable grating pitch. The wavelength $\lambda$ of the laser should be less than two times the grating pitch. A relationship between the self-traceable grating pitch d and the natural constants is that $d = c/2 f_0$, where c is the speed of light propagating in a vacuum and $f_0$ is an energy level transition frequency constant used by any of the atoms in the process of manufacturing the grating by using the atomic lithography.

Figure 5:
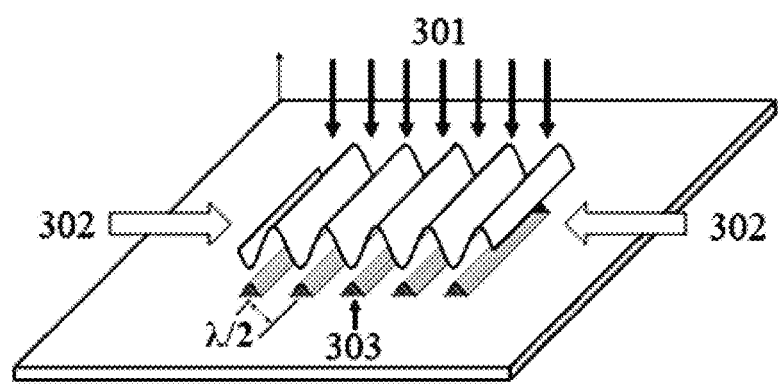
FIG. 5 is a schematic diagram of a self-traceable grating deposition process of some embodiments.

In this embodiment, a chromium atom is used as an example. FIG. 5 is a schematic diagram of a self-traceable grating deposition process. Take the manufacturing process of a one-dimensional chromium atomic lithography grating as an example, generally, a crucible containing chromium powder is heated to a temperature between 1550° C. and 1650° C. in vacuum environment to make the chromium powder reach a sublimation state, and the chromium powder is directed out from a 1 mm effusion hole to form a metal atomic beam. One-dimensional cooled laser is then adjusted orthogonal to the metal atomic beam in conjunction with a theodolite and an altimetry tool so that the divergence angle of the metal atomic beam is reduced to less than 1 mrad according to a laser monitoring effect. Then, the collimated Cr atomic beam 301 is converged by laser orthogonal to the collimated Cr atomic beam 301 to a standing wave field and is deposited on a sample plate by a dipole force to form a one-dimensional deposition grating 303. The convergent laser 302 has a wavelength of 425.6 nm and a resonance transition energy level corresponding to the Cr atom is $^7S_3 \rightarrow ^7P_4^0$. The frequency of the convergent laser is adjusted to a positive detuning (+20 MHz) or a negative detuning (−250 MHz) position corresponding to the center frequency of the resonance energy level. Thus, the period of the one-dimensional Cr atomic lithography grating structure formed is half the wavelength of the laser used and is 212.8 nm. In addition, during the manufacturing process, the convergent laser is limited to 50% or less by a sample cutting ratio. The substrate is generally made of silicon or indium phosphide materials.

Figure 6:
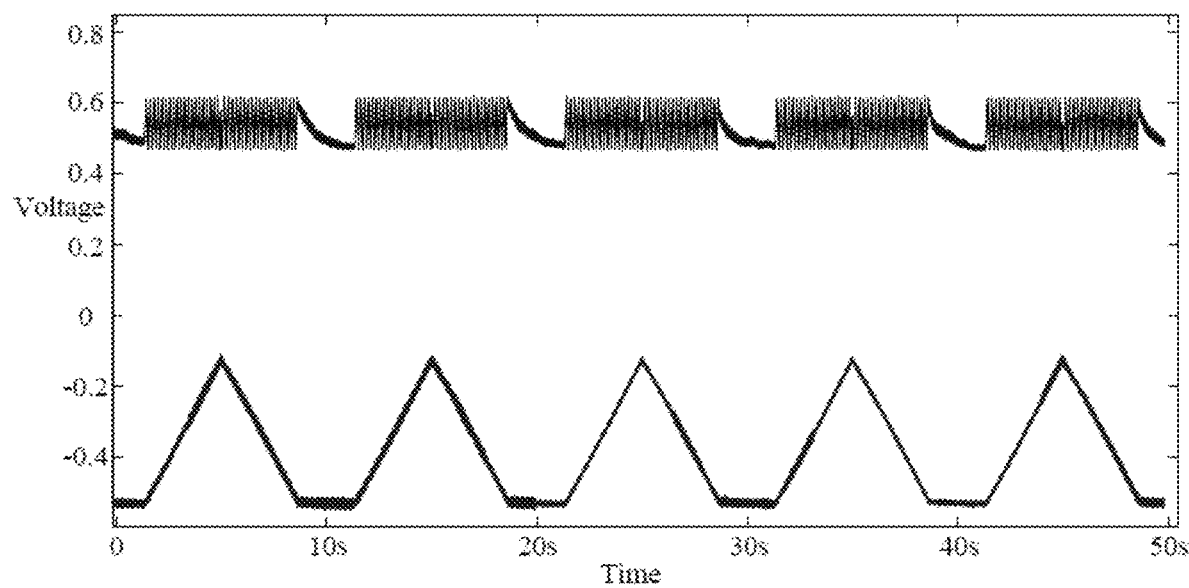
FIG. 6 is a schematic diagram of a waveform of an interference signal under a condition that a displacement platform is driven by a triangular wave of some embodiments.

FIG. 6 is a schematic diagram of a waveform directly obtained by a signal reception module under a condition that a displacement platform is driven by a triangular wave. The waveform in the shape of triangle in FIG. 6 shows the motion information of the displacement platform. A uniform increase in the positive direction and a uniform decrease in the negative direction indicate that the displacement platform moves at a uniform speed in two different directions. The sinusoidal curve in FIG. 6 shows a single interference signal obtained directly by the photoelectric detection module in the reading head structure of the self-traceable grating interferometer. The light intensity of the single interference signal has the following relationship:

$$I \propto \cos\left(\frac{4\pi x}{d}\right),$$

where d=212.8 nm is the chromium atomic lithography grating pitch, and x is the distance by which the displacement platform moves.

Embodiments of the present disclosure have been described above. It is to be understood that those of ordinary skill in the art may make many modifications and changes in accordance with the concept of the present disclosure without creative work. Therefore, any technical solution which can be obtained by logical analysis, reasoning, or limited experiments based on the related art by those skilled in the art according to the concept of the present disclosure shall be within the scope determined by the claims.

What is claimed is:

1. A system for precision displacement measurement based on a self-traceable grating interference, comprising:
   a coherent light source;
   a photoelectric detection module;
   a self-traceable grating, wherein the self-traceable grating is a grating which is manufactured and obtained in a manner of heating and sublimating a metal material to a gas state and directing a metal atomic beam by means of effusion in a vacuum environment by using atomic lithography, and the self-traceable grating is configured to be arranged on a to-be-measured displacement motion platform; and
   a signal processing module, wherein the coherent light source, the photoelectric detection module and the signal processing module are sequentially connected;
   wherein after laser generated by the coherent light source propagates through the photoelectric detection module, the laser is incident on the self-traceable grating and diffracts with the self-traceable grating to obtain diffracted light, the diffracted light returns to the photoelectric detection module to continue propagating to obtain an interference signal, and the interference signal enters the signal processing module;
   wherein the signal processing module is configured to collect the interference signal to obtain a motion displacement and a motion direction; and
   wherein the signal processing module is configured to collect the interference signal to obtain the motion displacement and the motion direction by:
      acquiring a light intensity of the interference signal; and
      obtaining, based on a relational expression $$I \propto \cos\left(\frac{4\pi x}{d}\right),$$

a one-dimensional motion distance x of a grating plane where the self-traceable grating (3) is located, wherein I is the light intensity of the interference signal and d is a period of the self-traceable grating (3); and
      solving phase information of an interference signal in each path through phase unwrapping and arctangent operation so as to determine a positive or negative direction of a motion.

2. The system according to claim 1, wherein the coherent light source is connected to the photoelectric detection module via a free-space connection or via an optical fiber.

3. The system according to claim 1, wherein the photoelectric detection module comprises a diffracted light generation unit and a signal reception unit;
   wherein the diffracted light generation unit comprises a first wave plate, a first polarization splitting prism, a second wave plate, a third wave plate, a first planar mirror and a second planar mirror; wherein
   the laser received by the first wave plate is decomposed into vertically polarized light and horizontally polarized light in equal proportions through the first polarization splitting prism;
   after sequentially passing through the third wave plate and the first planar mirror, the vertically polarized light is incident on the self-traceable grating at a Littrow angle and diffracts with the self-traceable grating to obtain first diffracted light, and
   after sequentially passing through the second wave plate and the second planar mirror, the horizontally polarized light is incident on the self-traceable grating at the Littrow angle and diffracts with the self-traceable grating to obtain second diffracted light; and the first diffracted light and the second diffracted light return along respective original optical paths and enter the signal reception unit together after being combined.

4. The system according to claim 3, wherein
the first wave plate is a half-wave plate which makes a polarization direction of the laser at 45° relative to an incident plane; and
the second wave plate and the third wave plate are quarter-wave plates which make a fast axis at 45° relative to the incident plane.

5. The system according to claim 3, wherein the signal reception unit comprises a non-polarizing beam splitting plate, a fourth wave plate, a fifth wave plate and two detection sub-units; wherein
the two detection sub-units are respectively arranged corresponding to the fourth wave plate and the fifth wave plate;
a diffracted light passing through the non-polarizing beam splitting plate is divided in a non-polarizing manner into first light and second light in equal proportions of a light intensity,
the first light is sequentially incident on the fourth wave plate and one of the two detection sub-units corresponding to the fourth wave plate, and
the second light is sequentially incident on the fifth wave plate and another one of the two detection sub-units corresponding to the fifth wave plate; and each of the two detection sub-units is connected to the signal processing module.

6. The system according to claim 5, wherein the fourth wave plate is a quarter-wave plate which makes a fast axis at 45° relative to an incident plane, and the fifth wave plate is a half-wave plate which makes a fast axis at 22.5° relative to the incident plane.

7. The system according to claim 5, wherein each of the two detection sub-units comprises a second polarization splitting prism, a first photodetector and a second photodetector, and the first photodetector and the second photodetector respectively receive vertically polarized light and horizontally polarized light decomposed by the second polarization splitting prism in equal proportions so as to form the interference signal.

8. The system according to claim 1, wherein a wavelength of the laser of the coherent light source is less than two times a period of the self-traceable grating.

* * * * *